United States Patent [19]

Cherenko

[11] 4,121,985

[45] Oct. 24, 1978

[54] PHOTOCROSSLINKED INNERLAYER

[75] Inventor: Joseph Cherenko, Valencia, Pa.

[73] Assignee: PPG Industries, Inc., Pittsburgh, Pa.

[21] Appl. No.: 682,426

[22] Filed: May 3, 1976

[51] Int. Cl.$^2$ .............................. C08F 8/00; C08F 8/18
[52] U.S. Cl. ........................... 204/159.14; 204/159.18; 204/159.19; 428/424; 428/425; 428/437; 428/441
[58] Field of Search ...................... 204/159.19, 159.11, 204/159.14, 159.18

[56] References Cited

U.S. PATENT DOCUMENTS

| | | | |
|---|---|---|---|
| 3,360,448 | 12/1967 | Schneider et al. | 204/159.19 |
| 3,721,580 | 3/1973 | Trott et al. | 204/159.11 X |
| 3,839,171 | 10/1974 | Akamatsu et al. | 204/159.15 |
| 3,840,448 | 10/1974 | Osborn et al. | 204/159.14 |
| 3,864,133 | 2/1975 | Hisamatsu et al. | 204/159.23 X |
| 3,948,665 | 4/1976 | Richter et al. | 204/159.19 X |
| 3,966,573 | 6/1976 | Bean | 204/159.23 |

*Primary Examiner*—Richard B. Turer
*Attorney, Agent, or Firm*—Donna L. Seidel

[57] ABSTRACT

The surface characteristics of a partially crosslinked polyurethane innerlayer in a bilayer laminate are further improved by treating the polymer film with a small amount of a compound such as tetrahydrofuran, 1,4 dioxane, dimethyl formamide, morpholine, methylene chloride or secondary or tertiary lower alkyl amines in addition to the photoinitiator.

7 Claims, No Drawings

PHOTOCROSSLINKED INNERLAYER

REFERENCE TO RELATED APPLICATIONS

This invention relates to a further improvement over the invention described and claimed in U.S. Pat. No. 4,039,720, entitled "Laminated Windshield with Improved Innerlayer" filed on even date herewith by Joseph Cherenko and Charles W. Lewis.

BACKGROUND OF THE INVENTION

1. Field of the Invention

The invention relates broadly to the art of making safety glass and more specifically to the art of making safety glass windshields combining improvements in safety performance and optical quality durability.

2. Description of the Prior Art

Safety glass is a well known term describing a glass-plastic laminate designed to reduce the severity of lacerative injuries resulting from impact sufficient to break the glass. A plastic film is laminated to a glass sheet so that upon impact sufficient to break the glass, the film adheres to the glass fragments, thus minimizing their dispersion. To be useful as safety glass a laminate must have the following properties over a wide range of temperature and moisture conditions: (1) high energy absorption to minimize concussive injuries on impact, (2) high shear and tear strength to prevent rupture of the film by glass fragments, (3) sufficient adherence between the layers to minimize dispersion of glass fragments thereby reducing the potential for lacerative injury, and (4) good optical quality.

Safety glass commercially employed is commonly a multiple laminate of two plies of glass with a polyvinyl butyral interlayer. Alternative safety glass laminates, particularly for use as automobile windshields, are proposed either in the form of a single glass ply with a plastic innerlayer or in the form of standard commercial safety glass as described above with a plastic innerlayer on the inboard glass ply. Upon impact sufficient to break these alternative forms of windshields, the probability of encountering glass fragments inside the passenger compartment is reduced. However, since the innerlayer will be exposed, the demands on the plastic film are much greater. It must not only meet the requirements of energy absorption, tear strength, adherence and optical quality previously discussed, but its surface must also have good weathering properties, chemical stability and abrasion resistance to provide durability for its required optical quality.

Thermoset polymer films typically have such durability; however, such films are difficult to laminate. In addition, rigid films contribute to concussive injury. Thermoplastic polymer films are relatively easy to laminate and are sufficiently ductile to absorb energy on impact, but they are often moisture and solvent sensitive and their surfaces are easily scratched, resulting in a loss of optical transparency.

It is known in the polymer art that some thermoplastic polymers, if crosslinked, become less elastomeric, less soluble, and in many respects similar to thermoset polymers. Thermoplastic polymers may be crosslinked during the polymerization reaction. However, crosslinked polymers are difficult to process. Alternatively, the polymer formulation may be treated with a crosslinking agent which can be activated subsequent to forming the polymer into the desired shape. Photochemical activation of a photosensitive crosslinking agent is an example.

The photochemical properties of benzophenone are well known. For example, when exposed to ultraviolet radiation, such as sunlight, benzophenone in solution in an organic medium, such as isopropanol, produces tetraphenylethylene glycol. The reaction mechanism consists of the following sequence of steps:

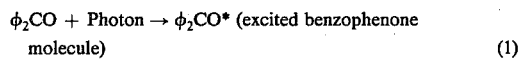

$\phi_2CO + Photon \rightarrow \phi_2CO^*$ (excited benzophenone molecule) (1)

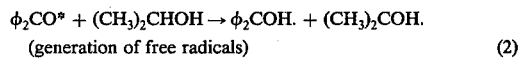

$\phi_2CO^* + (CH_3)_2CHOH \rightarrow \phi_2COH\cdot + (CH_3)_2COH\cdot$
(generation of free radicals) (2)

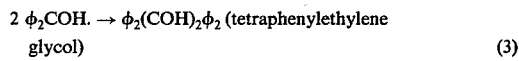

$2\ \phi_2COH\cdot \rightarrow \phi_2(COH)_2\phi_2$ (tetraphenylethylene glycol) (3)

Excited benzophenone molecules are equally capable of abstracting hydrogen from hydrocarbons. The well-known oxidative dimerization of aliphatic hydrocarbons by photochemical reaction with benzophenone proceeds as follows:

$\phi_2CO + Photon \rightarrow \phi_2CO^*$ (4)

$\phi_2CO^* + RCH(CH_3)_2 \rightarrow \phi_2COH\cdot + RC(CH_3)_2\cdot$ (5)

$2RC(CH_3)_2\cdot \rightarrow RC(CH_3)_2 C (CH_3)_2R$ (6)

The extension of this reaction for alkyl dimerization into the field of alkyl polymer crosslinking is shown in the discussion of the following references.

A method for decreasing the thermoplasticity and solubility of polymers of ethylene usable as safety glass interlayers is taught by Roedel in U.S. Pat. No. 2,484,529. The method involves blending such polymers with ketones such as acetone, benzophenone or benzoin, and then exposing the blend to ultraviolet light.

An improved method for making polyethylene articles is taught by Tocker in U.S. Pat. No. 3,214,492. The method involves copolymerizing ethylene with an acryloxy- or methacryloxy- substituted benzophenones or acetophenones, shaping the copolymer into a useful article, and exposing the article to ultraviolet radiation to produce crosslinking.

Potts et al., in U.S. Pat. No. 3,219,566 teach that anthrone is superior to benzophenone for crosslinking polyethylene and polypropylene in the presence of ultraviolet light.

Bell teaches a method for making crosslinkable polyesters in U.S. Pat. No. 3,518,175. The method involves copolymerizing the polyester with a substituted benzophenone. Exposure of the resulting photosensitized terpolymer to ultraviolet radiation produces crosslinking.

It is not shown or suggested in the polymer art that polyurethanes or other polymers are likewise crosslinkable by exposure to ultraviolet light in the presence of benzophenone to produce a transparent layer that is crosslinked in at least a surface portion to improve its solvent-abrasion resistance without degrading its desired mechanical, adhesive and optical properties so that the polymer may be employed as an exposed innerlayer in a safety glass laminate.

SUMMARY OF THE INVENTION

The present invention provides further improvement to the solvent-abrasion resistance of a surface-cross-linked innerlayer in laminated safety glass as disclosed in U.S. Pat. No. 4,039,720, entitled "Laminated Windshield With Improved Innerlayer" which disclosure is incorporated herein by reference.

The present invention provides for such improvement by treating the polymer film with a small amount of a compound which enhances the effects of photocrosslinking with certain photoinitiators. The treated polymer film is laminated to a glass ply by conventional techniques. After lamination, the exposed surface of the film is irradiated with ultraviolet light which activates the photoinitiator which, in turn, initiates photocrosslinking of the polymer.

The crosslinked polymer surface has better solvent-abrasion resistance than either an unmodified polymer surface or a surface modified by crosslinking after treatment with photoinitiator alone.

DETAILED DESCRIPTION OF THE PREFERRED EMBODIMENTS

Polyurethane prepared by the reaction of an organic diisocyanate with a polyester polyol is treated with a photoinitiator, preferably benzophenone, and an enhancer, preferably by soaking a cast or extruded sheet of polyurethane in a solution of both the photoinitiator and the enhancer in an appropriate solvent. Preferred enhancers for benzophenone include 1,4 dioxane, triethylamine, morpholine, dimethyl formamide, methylene chloride, tetrahydrofuran, dipropylamine, tripropylamine, dibutylamine, tributylamine and diethanolamine. The preferred solvent is methyl ethyl ketone (MEK). The above polyurethanes may also be treated with 2[2'-hydroxy 5'-methylphenyl] benzotriazole as the photoinitiator and tetrahydrofuran as the enhancer. Alternatively, the polymer film may be sprayed with a solution of photoinitiator and enhancer. The treated film is then dried and laminated to a rigid transparent substrate, preferably glass, by conventional laminating techniques. The preferred technique is to press the film between two glass plies, one of which is coated with a release agent such as polysiloxane or polytetrafluoroethylene (TEFLON®), and to heat the assembly to promote adhesion of the film to the uncoated glass ply. A detailed description of a preferred technique for lamination is found in U.S. Pat. No. 3,808,077 to Rieser et al, which description is incorporated herein by reference.

Following lamination, the free surface of the film is exposed to actinic radiation, preferably ultraviolet radiation in the range of 200 to 400 nm, until sufficient crosslinking has occurred to render the surface substantially more solvent-abrasion resistant than an untreated surface.

The laminates thus produced are particularly useful as windshields, sidelights and backlights in automobiles and other vehicles. For optimum safety performance, the preferred laminate comprises a 3/32 to 3/16 inch (2.3 to 4.5 millimeter) thick glass ply and a 15 to 40 mil (0.4 to 1 millimeter) thick polymer film.

The present invention will be further understood from the description of specific examples which follow. The substrates in all examples are ⅛ inch (3 millimeter) thick plies of soda-lime-silica glass. The films are laminated to the substrates by assembling the film between two plies of glass, one of which is coated with a release agent, placing the assembly in a plastic bag, evacuating and sealing the bag and placing the bagged assembly in an oil autoclave at a temperature of about 300° F. (about 149° C.) and pressure of about 200 pounds per square inch (about $1.38 \times 10^6$ newtons per square meter) for about 45 minutes. The laminates are then irradiated by lamps which produce ultraviolet radiation predominantly in the range of 300 to 380 nanometers.

Following the ultraviolet treatment, the exposed polymer surfaces are abraded with 400 mesh synthetic alundum abrasive and acetone by 1000 passes of a 1 pound (454 gram) weighted felt pad. The solvent-abrasion resistance of each surface is determined by dividing a 1.5 inch (38.17 millimeter) square in the center of a 2 inch by 4 inch (about 50 millimeter by 100 millimeter) sample into nine areas and measuring the percent haze in each area. The data reported herein are the averages of the nine individual area haze measurements for each sample. The percent haze is measured on a Gardner Automatic Pivotable Sphere Haze meter with backlighting and an illuminant "C" filter. The solvent abrasion resistances of the samples described in Examples I through X, as measured by the percent haze after acetone-abrasion, are compared in Table I.

The following examples are offered to illustrate the present invention and its preferred embodiments.

EXAMPLE I

A polyurethane composition is prepared by reacting 4,4'-methylene-bis-(cyclohexyl isocyanate), a hydroxy-terminated polybutylene adipate diol of molecular weight about 2000, and 1,4 butane diol in a mole ratio of about 3.71:1.00:2.71 for about 24 hours at a temperature of about 290° F. (about 143° C.). The polyurethane is then extruded as a 20 mil (about 0.5 millimeter) thick sheet. Four inch (100 millimeter) square portions of the polyurethane sheet are laminated to glass substrates. An untreated, unabraded laminate has 3.0 percent haze. A laminate is cut into 2 by 4 inch (about 50 by 100 millimeter) samples which are abraded with 400 mesh synthetic alundum abrasive and acetone by 1000 passes of a 1 pound (454 gram) weighted felt pad. The abraded samples have an average of 8.1 percent haze.

EXAMPLE II

Glass-polyurethane laminates are prepared as in Example I. Two samples are then exposed to ultraviolet radiation, one for 15 minutes and the other for 60 minutes. The exposed polymer surfaces are then abraded as in Example I. The abraded samples show 11.7 and 13.6 percent haze.

EXAMPLE III

A polyurethane film as described in Example I is soaked in methyl ethyl ketone (MEK) for 45 minutes at room temperature. The film is then dried and laminated to a glass substrate. Two 2 by 4 inch (50 by 100 millimeter) samples of the laminate are then exposed to ultraviolet radiation and subjected to solvent-abrasion treatment as in Example II. The samples show 13.6 and 8.9 percent haze.

EXAMPLE IV

A polyurethane film as described in Example I is soaked in a solution of 5 percent benzophenone in MEK for 45 minutes at room temperature. The film is dried and laminated as in Example III, and exposed to ultraviolet light for 15 minutes. Following the solvent-abrasion treatment as in the previous examples, the sample shows only 3.5 percent haze.

EXAMPLE V

A sample is prepared as in Example IV except that the MEK soak solution contains 2.5 percent benzophenone and the laminate is exposed to ultraviolet radiation for 60 minutes. After solvent-abrasion as in the previous examples, the sample shows 4.8 percent haze.

EXAMPLE VI

A polyurethane film is soaked in a solution which contains 2.5 percent benzophenone and 2.5 percent triethylamine in MEK. The film is dried and laminated and exposed to ultraviolet radiation for 15 minutes. Following the solvent-abrasion treatment as in the previous examples, the sample has 4.4 percent haze.

EXAMPLE VII

A polyurethane film is soaked in a solution which contains 2.5 percent benzophenone in a solvent which comprises 10 percent dimethyl formamide (DMF) and 90 percent MEK. The film is dried, laminated and exposed to ultraviolet for 15 minutes. After solvent-abrasion as in the previous examples, the sample has 3.75 percent haze.

EXAMPLE VIII

A sample is prepared as in Example VII, except that the solvent comprises 10 percent tetrahydrofuran (THF) and 90 percent MEK. The abraded sample has 3.7 percent haze.

EXAMPLE IX

A sample is prepared as in Example VI except that the triethylamine is replaced with tributylamine. After ultraviolet exposure and solvent abrasion, the sample has 3.3 percent haze.

EXAMPLE X

A sample is prepared as in Example IX except that the tributylamine is replaced with morpholine. The abraded sample has 3.0 percent haze.

be made without departing from the spirit of this invention. For example, common glass substitutes such as acrylics, polycarbonates, and other rigid transparent plastics may be used as the substrate. Thermoplastic polymers, such as polyvinyl acetals, specifically polyvinyl butyral, may be used in place of polyurethanes, and other chemical compounds which enhance the effects of photocrosslinking may be substituted for the named compounds. These and other variations will become obvious in the light of the claimed subject matter that follows.

I claim:

1. In a method for crosslinking a thermoplastic polymer which is essentially free of ethylenic unsaturation and selected from the group consisting of polyurethanes and polyvinyl acetals by physically treating the polymer with a composition comprising a photoinitiator and irradiating said polymer with actinic radiation in the presence of said photoinitiator, the improvement which comprises treating said polymer, prior to irradiating, with a composition comprising a photoinitiator and a compound selected from the group consisting of 1,4 dioxane, dimethyl formamide, tetrahydrofuran, methylene chloride, morpholine, diethanolamine, diethylamine, dipropylamine, triethylamine, tripropylamine and tributylamine which enhances the solvent-abrasion resistance of a polymer surface crosslinked by said photoinitiator.

2. The method according to claim 1, wherein said polymer is a polyurethane which is the reaction product of an aliphatic diisocyanate and a polyester polyol.

3. The method according to claim 2, wherein said photoinitiator is benzophenone.

4. The method according to claim 3, wherein said enhancer is triethylamine.

5. The method according to claim 2, wherein said photoinitiator is 2[2'-hydroxy 5'-methylphenyl] benzotriazole.

6. The method according to claim 5, wherein said enhancer is tetrahydrofuran.

7. In a method for crosslinking a thermoplastic polymer which is essentially free of ethylenic unsaturation and selected from the group consisting of polyurethanes

TABLE I

Solvent-Abrasion Resistance of Polyurethane Innerlayer

| EXAMPLE | PHOTOINITIATOR | ENHANCER | SOLUTION | UV EXPOSURE (minutes) | HAZE (%) |
|---------|----------------|----------|----------|-----------------------|----------|
| I       | None           | None     | None     | None                  | 3.0*     |
|         | None           | None     | None     | None                  | 8.1      |
| II      | None           | None     | None     | 15                    | 11.7     |
|         | None           | None     | None     | 60                    | 13.6     |
| III     | None           | None     | MEK      | 15                    | 13.6     |
|         | None           | None     | MEK      | 60                    | 8.9      |
| IV      | 5% BP          | None     | MEK      | 15                    | 3.5      |
| V       | 2.5% BP        | None     | MEK      | 60                    | 4.8      |
| VI      | 2.5% BP        | 2.5% TEA | MEK      | 15                    | 4.4      |
| VII     | 2.5% BP        | 10% DMF  | MEK      | 15                    | 3.75     |
| VIII    | 2.5% BP        | 10% THF  | MEK      | 15                    | 3.7      |
| IX      | 2.5% BP        | 2.5% TBA | MEK      | 15                    | 3.3      |
| X       | 2.5% BP        | 2.5% M   | MEK      | 15                    | 3.0      |

*Unabraded
MEK — Methyl ethyl ketone
BP — benzophenone
TEA — triethylamine
DMF — dimethylformamide
THF — tetrahydrofuran
TBA — tributylamine
M — morpholine Although the present invention has been described in detail with respect to bilayer laminates of glass and polyurethane, the scope of the invention is not intended to be limited thereto. It will be evident to persons skilled in the art that modifications and variations may and polyvinyl acetals by treating said polymer with a composition comprising benzophenone and irradiating said polymer with actinic radiation in the presence of benzophenone, the improvement which comprises treating said polymer, prior to irradiating, with a composition comprising benzophenone and a compound selected from the group consisting of 1,4 dioxane, dimethyl formamide, tetrahydrofuran, methylene chloride, morpholine, diethanolamine, diethylamine, dipropylamine, triethylamine, tripropylamine, and tributylamine which enhances the solvent-abrasion resistance of a polymer surface crosslinked by benzophenone.

* * * * *